Sept. 20, 1932.  J. F. ROBB  1,877,974
PIPE LINE DEPOSITING MACHINE
Filed June 16, 1931  3 Sheets-Sheet 2
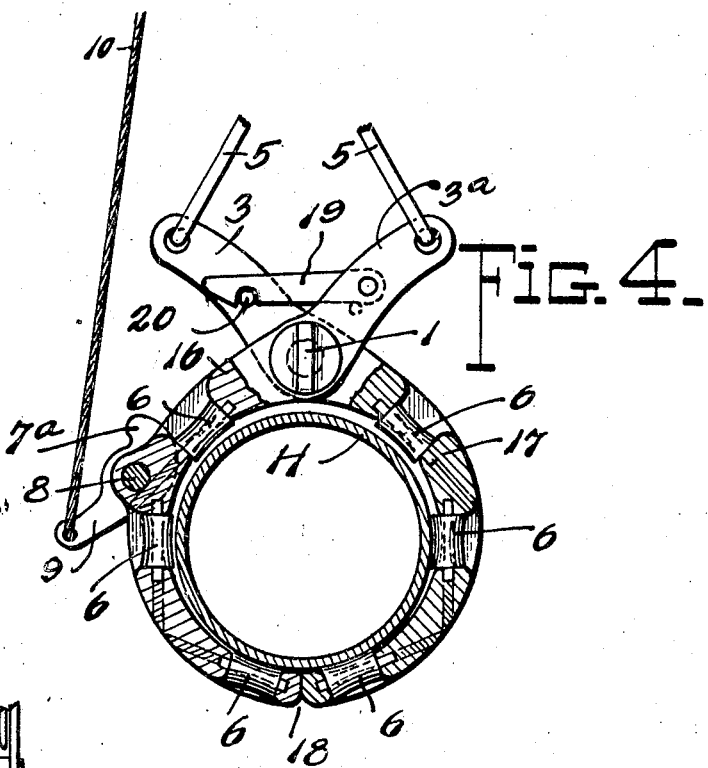
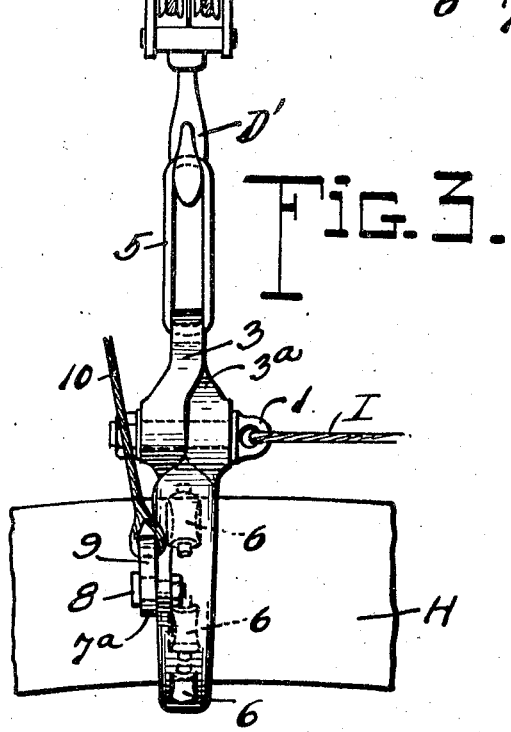
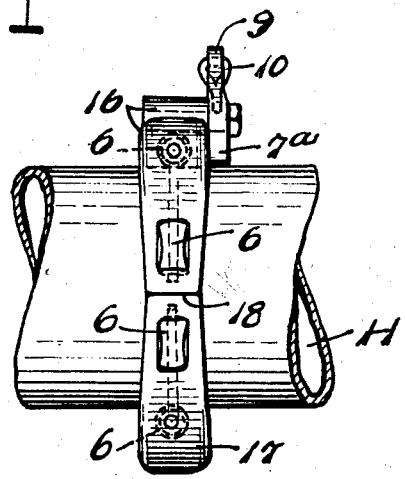
Inventor
John F. Robb
By Robb & Robb
Attorneys

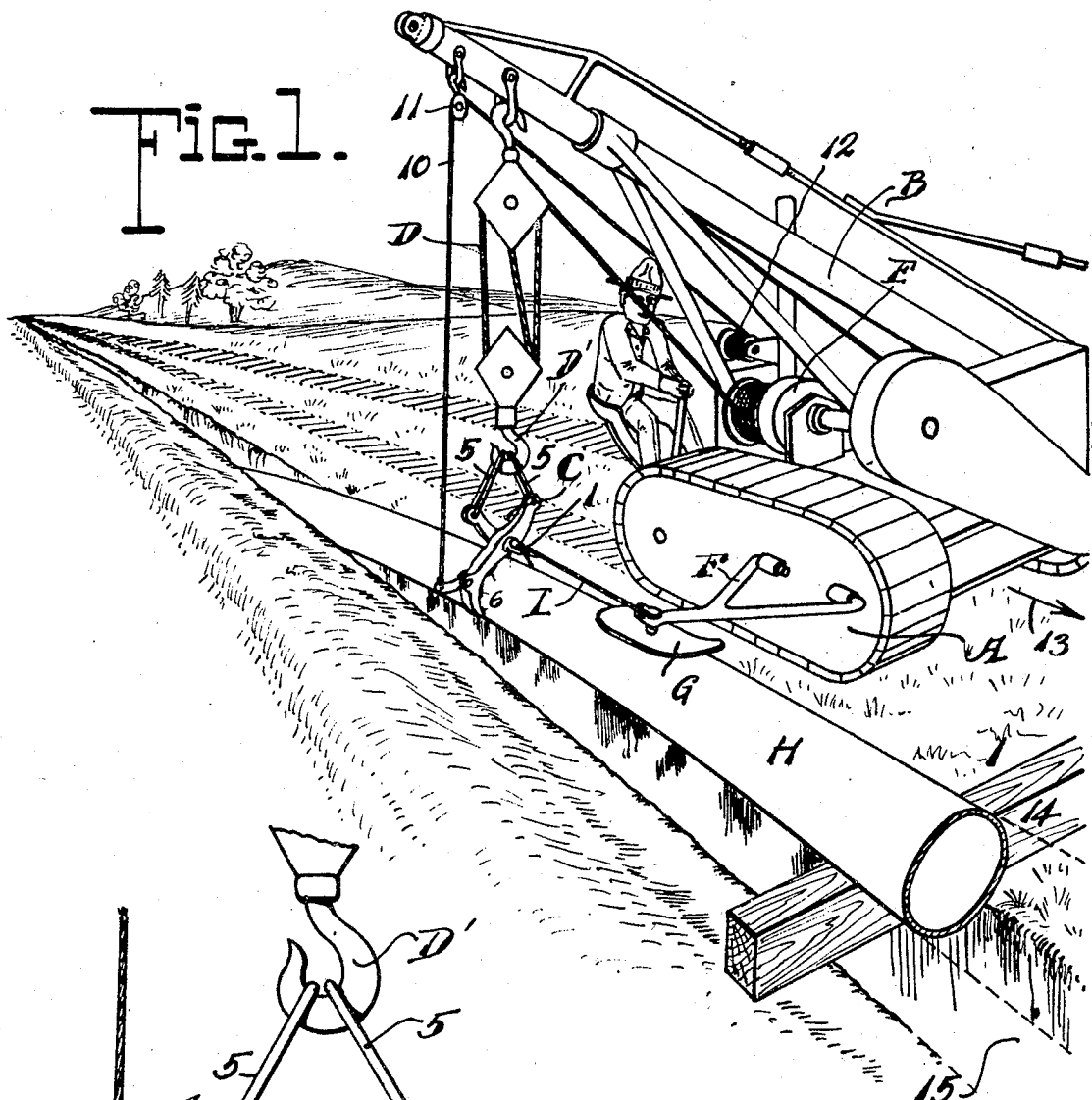

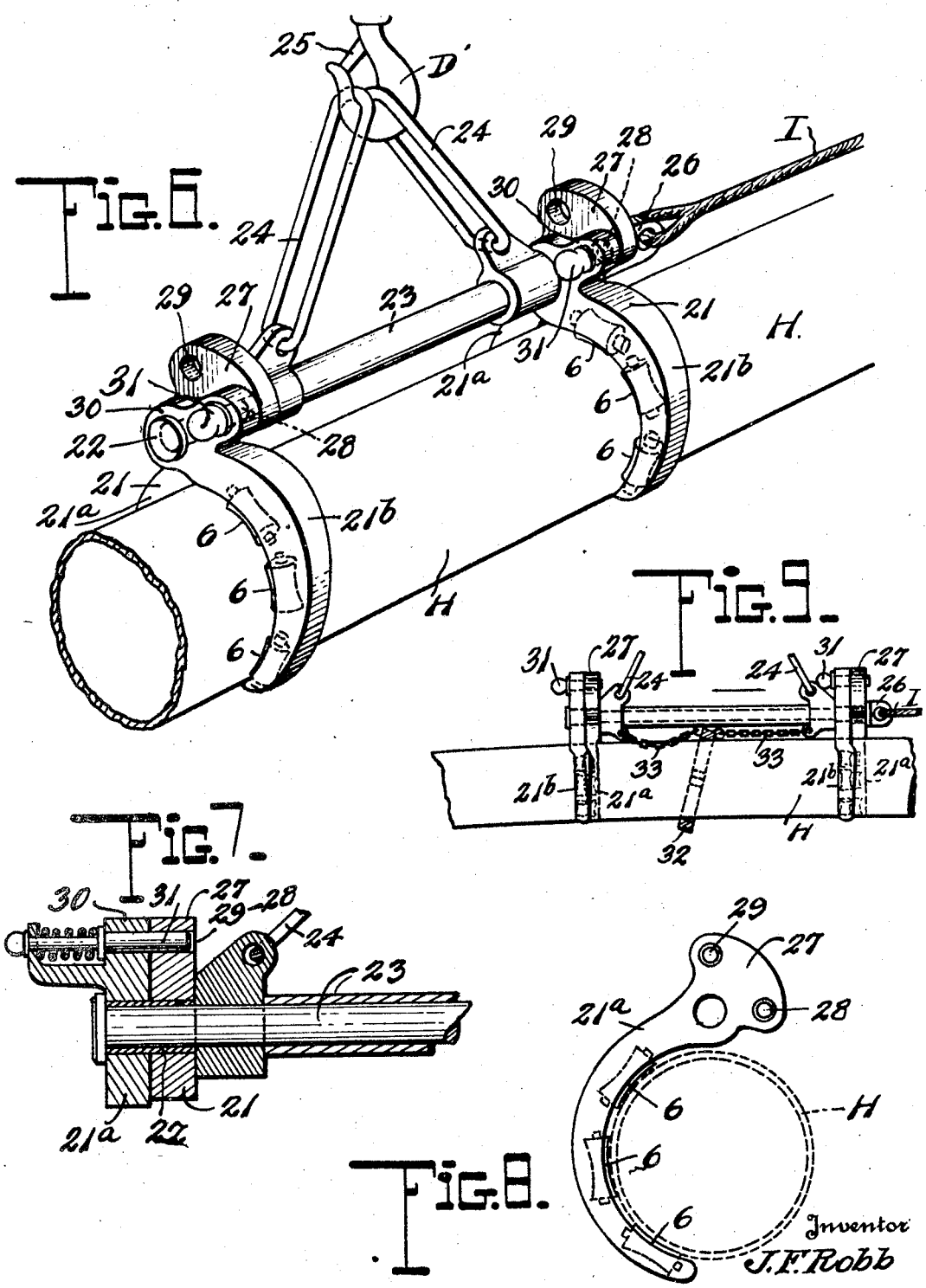

Patented Sept. 20, 1932

1,877,974

UNITED STATES PATENT OFFICE

JOHN F. ROBB, OF CLEVELAND HEIGHTS, OHIO

PIPE LINE DEPOSITING MACHINE

Application filed June 16, 1931. Serial No. 544,871.

This invention relates to pipe handling equipment and more particularly to handling and placing pipe in position in oil and gas pipe line construction work.

An object of my invention is to provide a pipe handling apparatus or tackle for use with boom equipped tractor vehicles and similar vehicles for supporting handling and lowering comparatively long sections of pipe in place in previously dug trenches in pipe line construction work.

Another object is to provide a pipe line tackle which may be easily manipulated to engage, handle and lower oil and gas pipe lines into final position whereby greater efficiency and economy in pipe line construction work is accomplished.

A further object is to provide a pipe line tackle which is easily placed in position on the pipe to be handled and which is provided with antifriction supporting means for the pipe whereby the tackle may be easily moved longitudinally of the pipe section while in pipe supporting position to thereby lower the pipe progressively in the trench prepared for this purpose, together with means on the tackle for positively engaging the pipe to prevent relative movement between the pipe and tackle when desired.

A further object is to provide a tackle which may be readily positioned on a string welded pipe line section whereby the pipe may be progressively lowered into its final position in a prepared pipe line trench, the tackle being provided with positive locking means to prevent the tackle from accidentally disengaging the pipe line.

A still further object is to provide a pipe line handling apparatus for progressively lowering a string of welded pipe in position in the previously prepared trench, which apparatus consists of a tractor having a supporting boom, a tackle member carried by the boom and having a sliding or rolling supporting contact with the pipe line whereby as the tractor moves forward the tackle moves along the string of pipe to progressively lower the same into position in a previously prepared pipe line trench.

A still further object is to provide a tackle element for use in pipe line construction work having curved supporting jaws provided with supporting rollers and means for holding the jaws in both their open and closed position whereby the tackle may be easily applied to the pipe and when so applied may be positively held in closed supporting position on the pipe.

Other and further objects and advantages of the invention will be hereinafter set forth and the novel features thereof defined by the appended claims.

In the drawings:

Figure 1 has a perspective view showing my improved form of pipe lowering apparatus in operation;

Figure 2 is a cross sectional view through the pipe in advance of the supporting tackle as seen in Figure 1;

Figure 3 is a side elevation of the tackle shown in Figure 2;

Figure 4 is a plan view of a slightly modified form of tackle, parts being broken away and shown in section;

Figure 5 is a bottom plan view of the form of invention shown in Figure 4;

Figure 6 is a perspective view of a further modified form of pipe line tackle showing the same secured in position on the section of pipe line;

Figure 7 is a fragmentary vertical longitudinal sectional view through the pivotal sections of the jaws of one of the pipe line tackles or grapple elements of Figure 6;

Figure 8 is a detailed plan view of one of the jaw members of the form of the invention shown in Figure 6, and Figure 9 is a somewhat diagrammatic elevation of the form shown in Figure 6 and disclosing one type of pipe engaging means to prevent relative movement between the grapple and pipe when it is desired to use the grapple for actually moving or transporting the pipe.

Like reference characters designate corresponding parts in the several figures of the drawings.

In pipe line construction work which is being carried on a very extensive way today it is usually customary to first prepare the pipe line trench for a considerable distance. The pipe sections are then placed on the ground near the trench and are lined up and their ends welded together thus forming a comparatively long string or section of welded pipe. Supporting timbers are placed or laid across the open trench at spaced intervals and the welded string of pipe is placed on the supporting timbers over the trench. The next operation is to lower the welded pipe into final position in the trench. Afterwards the trench is refilled with dirt and the work for that particular section is complete.

The usual method of final handling and lowering the welded pipe into position is comparatively crude and therefore considerable inefficiency and delay in this operation is caused since it usually requires several tractors and numerous attending workmen for this purpose. The tractors being used to raise the pipe off the supporting timbers at substantially fixed points while the men remove the timbers from under the pipe. The pipe is then lowered by the tractor to its final resting position in the trench whereupon the men must descend into the trench to remove the tackle from the pipe. The tractors are then moved up ahead to repeat this operation at successive points along the pipe line.

In the present method the grapple or tackle is positioned around the pipe and is hoisted so as to slightly lift the pipe from its supporting position with relation to one of the cross timbers. The cross timber is then removed and the tractor is set into operation and as it moves forward the tackle, due to its antifriction supporting relation with respect to the pipe is caused to advance along the pipe permitting the same to be continuously and gradually lowered into its final position in the trench.

Referring to Figure 1 of the drawings A represents any approved form of endless tread tractor provided with a tripod derrick or boom B from which the pipe handling tackle C is suspended in any suitable manner such as by the pulley blocks and cable D.

This cable may be wound or unwound from the drum E as desired to raise or lower the tackle C. The tractor as shown in this figure of the drawings is provided with a pivoted arm or extension F formed at its extremity with a shoe G adapted to ride on the upper surface of the pipe line H. Any suitable flexible or rigid connection such as a cable or rod I is attached at one end to the apertured extremity of the pivot 1 for the jaws 2 and 2a of my improved pipe line tackle C.

The handle portions 3a of the jaws 2 and 2a are apertured at their free extremities as indicated at 4. Link members 5 are carried in the apertures 4 of the jaws and are arranged to be supported by the hook D' of the supporting pulley blocks as clearly shown in the drawings.

Each of the jaw members 2—2a has journalled therein a series of rollers 6 arranged to engage the exterior surface of the pipe line when the jaws are placed in position therein, the lower rollers constituting supporting means for the pipe. The jaw member 2 is provided with a cam member 7 pivoted at 8 and having a projecting actuating lever portion 9 to which the cable 10 is connected for shifting the cam into cooperating position with respect to the pipe line. Cable 10 is then led upwardly over a pulley 11 carried by the boom B. The cable is then brought down to a winding drum 12 carried by the tractor.

As seen in Figure 1 of the drawings the tractor is moving in the direction of the arrow 13 and as the shoe member G slides along the surface of the pipe it drags the tackle C thereafter. Due to the roller mounting within the tackle C it is comparatively free to move longitudinally along the surface of the pipe and while at the same time provides proper rolling support for the pipe at that particular point and of course as the tackle moves along, the pipe is raised sufficiently to permit an attendant to remove the timbers 14 so that the pipe will be gradually and progressively lowered into final position in the previously prepared trench 15 due to the forward movement of the machine as clearly seen in the drawings.

When it is desired to interrupt or reduce the free longitudinal movement of the tackle with respect to the pipe line as for instance if it was necessary to drag the pipe itself to reposition the same longitudinally of the trench the operator will cause the drum 12 to wind up the cable 10 which will swing the cam member 6 into engagement with one side of the pipe thereby creating sufficient frictional engagement for the above mentioned purpose.

In Figure 4 of the drawings it should be observed that the jaw members 16 and 17 are arranged to abut each other at the under side of the pipe as indicated at 18. The purpose of this is to prevent the closing action of the links 17 on the handle 3 and 3a from producing a clamping action on the pipe. In this form of the invention the rollers 6 are arranged similarly to that shown in Figure 2 but due to the abutment of the ends of the jaws 16 and 17 all of these rollers will not ordinarily be in contact with the outer surface of the pipe and the pipe will be to a greater extent free to move and adjust itself being primarily supported by the two lower rollers of the jaws. The handle member 3a in this form is provided with a pivoted latch 19 for engagement with a pin 20 carried by the other jaw 3. This latch when in operative position prevents any tendency for the jaws to open incident to the actuation of the camming 7a as shown in this figure of the drawings. The camming member just referred to while slightly different in shape functions similar to the camming member in Figures 1 and 2 and will not therefore be further described.

In Figure 6 of the drawings a still further modification of the embodiment is shown in which a pair of spaced supporting roller equipped jaws are provided as indicated generally at 21. These jaws are pivotally mounted at 22 on a longitudinally disposed rod 23 adapted to be supported from the hook D' in any suitable manner such as by the links 24. The hook D' may be provided with a latch 25 if desired to prevent accidental displacement of the links. The forward end of the rod 23 is apertured at 26 to receive the drag cable or rod I attached to the arm F of the tractor. Referring specifically to one pair of jaws 21 which is substantially a duplicate of the other pair it should be observed that these jaws carry the pipe engaging rollers 6 in a manner similar to the other embodiments. One of the jaws specifically indicated as at 21a terminates in a segmental portion 27 apertured at 28 and 29 while the other jaw specifically indicated at 21b terminates in the extension 30 carrying a slidable pin 31 arranged to be inserted in either one or the other of the apertures or openings 28 or 29. With the parts as seen in Figure 6 of the drawings the pins 31 are shown in position in the apertures 28 thereby locking the two jaws 21a and 21b in proper relative supporting position with respect to the pipe line H.

When it is desired to spread the jaws as for instance to position the tackle on a string of pipe intermediate the ends thereof the pin 31 is withdrawn from the aperture 28 thus freeing the jaws and permitting them to be opened to a position where the pin will line up with the aperture 29 and upon engagement of the pin with this aperture the jaws will be locked in their open or receiving position. Under these conditions the tackle may be lowered so as to be positioned on the pipe whereupon the pin is withdrawn, the jaws permitted to close around the pipe and the pin repositioned in the aperture 28. Figure 7 of the drawings shows a spring pressed pin 31 which will snap into position with either of the apertures 28 or 29 as the jaws swing to their operative or inoperative position as the case may be.

In order to provide some means for preventing the free longitudinal movement of this latter form of tackle just described I provide a split ring of substantially rectangular cross section as indicated at 32 which is designed to be slipped over the pipe and the ring sections bolted together. The ring is secured to the tackle by flexible connections such as chains 33 so that longitudinal movement of the tackle with respect to the pipe will cause this ring member to be tilted to the position shown whereupon it will engage and bind on the pipe thus preventing any further relative movement of the tackle member.

In the form disclosed in Figure 6 of the drawings it should be observed that since the pipe line is supported at spaced points there is less danger of the tackle bending or denting the pipe as it rolls therealong. Further than this if the pipe lines having the flange type of coupling are used it should be observed that one of the sets of jaws 21 may be permitted to remain in supporting position on the pipe while the other jaw has spread to permit the pipe to pass whereupon the last mentioned jaw can be closed and the other jaw opened to permit substantially uninterrupted travel of the tackle along even the flange coupling type of pipe line.

The pipe line handling of this invention may, of course, be applied to any conventional type of crane structures utilizing booms and having hoisting supporting lines or cables operated by suitable drum mechanism upon the crane body structure. Such cranes may be of the dragline, clam shell, or shovel types, because usually these types of machine have drum and cable apparatus that will be usable with the tackle means of this invention.

Having thus described my invention, what I claim as new and desire to secure by Letters Patent is:

1. In a pipe line handling apparatus, a crane type machine comprising a base portable to travel along a trench in which a pipe is to be laid, a boom on said base, tackle means on said boom, a grapple device carried by the tackle means and comprising a pipe supporting member, and antifriction means carried by the member for supporting the pipe to be handled in spaced relation to said member, for allowing free longitudinal movement between the pipe and supporting member, the means being axially disposed transversely of the pipe.

2. In a pipe line handling apparatus, a crane type machine comprising a base portable to travel along a trench in which a pipe is to be laid, a boom on said base, tackle means on said boom, a grapple device carried by the tackle means and comprising a pipe supporting element, means for moving the apparatus along the pipe line, and roller means carried by the supporting element to support a pipe line for free longitudinal movement relatively to the supporting element, the roller means having their axes arranged transversely of the direction of movement of the pipe.

3. In a pipe line handling apparatus, a pipe supporting element, antifriction means carried by said supporting element to support a pipe in spaced relation to said element for relative free longitudinal movement of the element with respect to the pipe and means on the element adjustable to prevent longitudinal movement between said pipe and said element.

4. In a pipe handling tackle, a portable support, pipe handling means carried by the support and comprising a pair of curved pipe line embracing jaws, rollers carried by the jaws to engage and support the pipe in spaced relation to the jaws to permit relative longitudinal movement between the pipe and the jaws while the pipe is being supported by the jaws, and separate means carried by the jaws movable to engage the pipe when desired to prevent relative longitudinal movement.

5. In a pipe line handling apparatus, a pipe supporting element including a pair of pivoted pipe encircling jaw members, said members terminating in crossed handle members, the opposite free ends of the jaw members abutting to prevent clamping of the pipe when in position thereon, and roller means carried by the jaw members to engage the pipe to be handled to permit free longitudinal movement of the pipe supporting element with respect to the pipe.

6. In a pipe line handling apparatus, a pipe supporting element including a pair of pivoted pipe encircling jaw members, said members terminating in crossed handle members, the opposite free ends of the jaw members abutting to prevent clamping of the pipe when in position thereon, roller means carried by the jaw members to engage the pipe to be handled to permit free longitudinal movement of the pipe supporting element with respect to the pipe, and pipe engaging means associated with the pipe supporting element and movable into engagement with the pipe to prevent said free longitudinal movement.

7. In a pipe laying machine of the crane type, comprising a portable base to travel along a trench in which a pipe is to be laid, a boom on said base, tackle means suspended from the boom and comprising a supporting member for the pipe arranged to embrace the pipe and slide freely along the same as the machine travels longitudinally relatively to the pipe, in combination with pull means laterally disposed relatively to the machine and connected with the said supporting member to exert a draft thereon to effect movement of the supporting member as the machine progresses lengthwise of the pipe.

8. In a pipe handling device of the class described, a pair of abutting curved pivoted jaw members for embracing and handling a predetermined size of pipe without clamping the same, said jaw members being pivoted opposite their abutting free extremities and terminating in crossed lifting handles, means for holding the jaws in closed position on a pipe to be handled and roller means on the jaw members for holding the pipe in spaced relation with respect to the jaws.

9. In a pipe handling device of the class described, a pair of abutting curved pivoted jaw members for embracing and handling a predetermined size of pipe without clamping the same, said jaw members being pivoted opposite their abutting free extremities and terminating in crossed lifting handles, means for holding the jaws in closed position on a pipe to be handled, roller means on the jaw members for holding the pipe in spaced relation with respect to the jaws, and latch means for holding the jaws in closed position.

10. In a pipe handling device of the class described, a plurality of curved pipe supporting jaw members movable to embrace the pipe to be handled by the device, means for locking the jaw members in predetermined spaced relation, roller means arranged on the jaws for supporting the pipe for free longitudinal movement with respect to the jaws and means for maintaining the jaw members at a predetermined angle with respect to the pipe during said relative movement.

11. In a pipe handling device of the class described, a plurality of curved pipe supporting jaw members movable to embrace the pipe to be handled by the device, means for locking the jaw members in predetermined spaced relation, roller means arranged on the jaws for supporting the pipe for free longitudinal movement with respect to the jaws, means for maintaining the jaw members at a predetermined angle vertically with respect to the pipe during said relative movement and supplemental pipe engaging means adjustable to prevent said longitudinal movement when desired.

12. In a pipe line handling tackle of the class described, a plurality of spaced complemental pivoted pipe embracing jaw members, a common support for said jaw members constituting a pivot therefor, draw bar means for advancing the jaw members along the pipe, roller means on the jaw members at right angles to the pipe and means for maintaining the jaw members in parallel relation to each other.

13. In a pipe line handling tackle of the class described, a plurality of spaced complemental pivoted pipe embracing jaw members, roller means on the jaw members at right angles to the pipe, a common support for said jaw members constituting a pivot therefor, draw bar means for advancing the jaw members along the pipe, means for maintaining the jaw members in parallel relation to each other, and at right angles to the axis of the pipe being handled.

14. In a pipe line handling tackle of the class described, a plurality of spaced complemental pivoted pipe embracing jaw members, a common support for said jaw members, draw bar means for advancing the jaw members along the pipe, roller means carried by the jaw member for permitting free longitudinal movement of the jaw members with respect to the pipe, means for maintaining the jaw members in parallel relation with respect to each other and at right angles to the axis of the pipe being handled and means for locking the jaw members in open or closed position.

15. In a pipe line handling tackle of the class described, a plurality of spaced complemental pivoted pipe embracing jaw members, a common support for said jaw members, draw bar means for advancing the jaw members along the pipe, roller means carried by the jaw member for permitting free longitudinal movement of the jaw members with respect to the pipe, means for maintaining the jaw members in parallel relation with respect to each other and at right angles to the axis of the pipe being handled, means for locking the jaw members in open or closed position, and means associated with said tackle and movable to prevent free longitudinal movement of the tackle with respect to the pipe.

16. In combination, a portable crane, and pipe handling apparatus carried thereby including pipe supporting tackle, comprising means for enabling the sliding movement of the tackle along the pipe being handled in the operation of depositing said pipe in a trench, and pulling means connecting the crane with the portion of the tackle engaging the pipe so as to compel the advancement of the tackle along the pipe as the crane progresses in a direction lengthwise of said pipe.

17. In combination, a crane type machine comprising drum and cable apparatus, and pipe engaging apparatus carried by said cable apparatus and adapted to embrace and support and move longitudinally of a line of pipe, means for controlling the drum and cable apparatus of the crane so as to engage and disengage the same from the pipe line, the pipe line engaging apparatus comprising members directly supporting the pipe and having means enabling sliding movement thereof along the pipe, together with draft means associated with the crane type machine connected with the pipe engaging apparatus for causing movement of the same along the pipe by a pull from the crane machine as the latter is advanced longitudinally of the pipe while supporting the latter, to thereby lower the pipe in a trench above which it may be disposed.

18. In combination, a crane machine comprising drum and cable apparatus, pipe line engaging apparatus connected with the drum and cable apparatus aforesaid and comprising pipe engaging parts adapted to removably engage a line of pipe, said parts having means enabling them to slide longitudinally of the pipe as the crane is advanced while its drum and cable apparatus are supporting the pipe, together with an operating draft connection between the crane machine and the pipe engaging parts to cause movement of the latter longitudinally of the pipe as the crane machine is moved forward and also lengthwise of the pipe, said draft means including a member having sliding connection with the pipe as the crane machine is advanced, and which is directly connected with said pipe engaging parts.

In testimony whereof I affix my signature.
JOHN F. ROBB.